(Model.)
O. COLVIN.
LUBRICATING APPARATUS.
No. 277,410. Patented May 8, 1883.
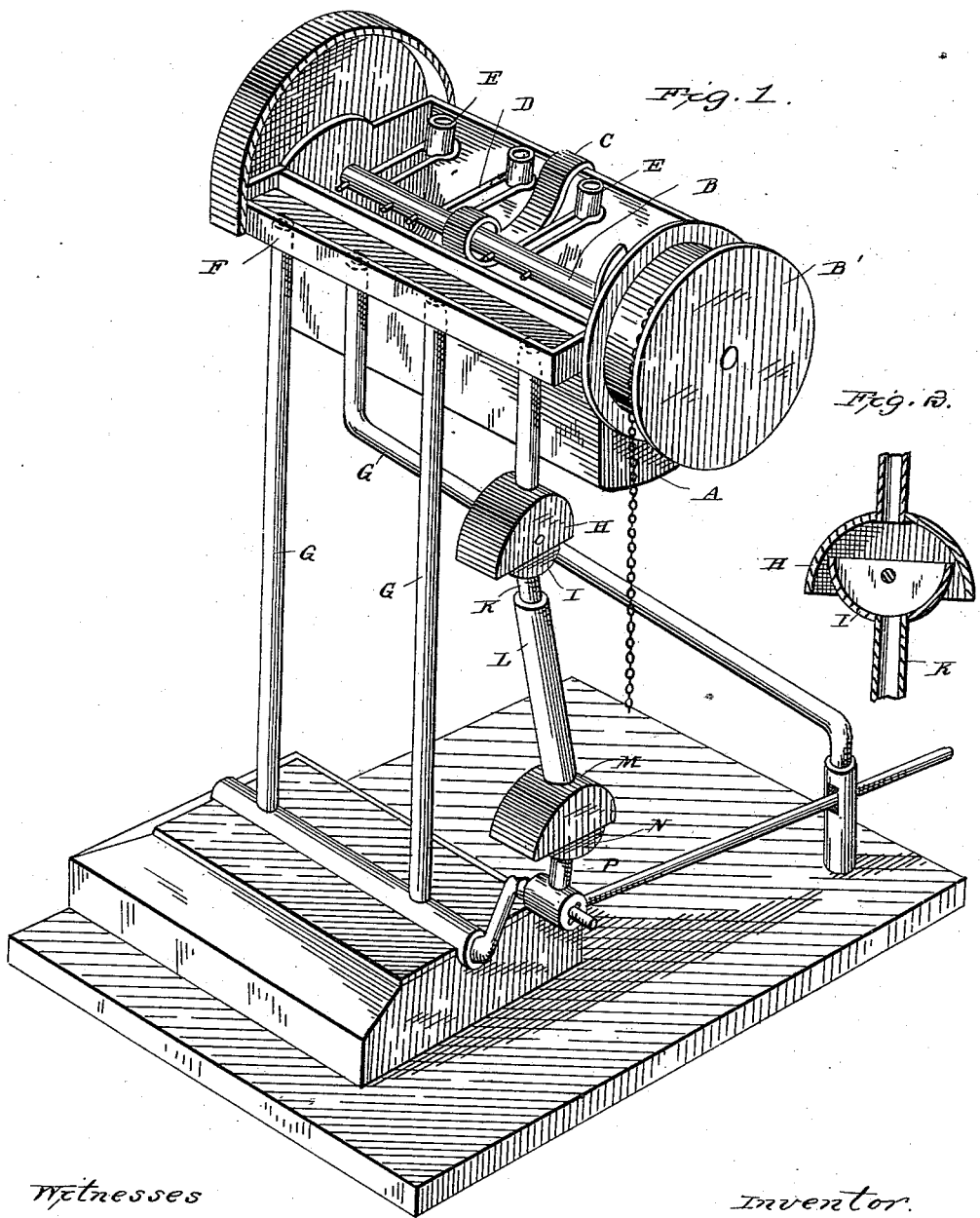
Witnesses
Edwin L. Yewell.
J. J. McCarthy.
Inventor.
Orson Colvin,
C. M. Alexander.
Attorney.

United States Patent Office.

ORSON COLVIN, OF SCHOOLCRAFT, MICHIGAN, ASSIGNOR TO JACOB BAUER, OF SAME PLACE.

LUBRICATING APPARATUS.

SPECIFICATION forming part of Letters Patent No. 277,410, dated May 8, 1883.

Application filed April 2, 1883. (Model.)

*To all whom it may concern:*

Be it known that I, ORSON COLVIN, a citizen of the United States, residing at Schoolcraft, in the county of Kalamazoo and State of Michigan, have invented certain new and useful Improvements in Lubricating Apparatus, of which the following is a specification, reference being had therein to the accompanying drawings.

This invention has for its object to provide certain improved means of oiling or lubricating such portions of machinery as are ordinarily out of convenient reach; and it is intended especially for use in connection with windmills, although it is applicable to all other classes of machinery.

The above-mentioned object I accomplish by the means illustrated in the accompanying drawings, in which—

Figure 1 represents a perspective view of my improved oiling or lubricating apparatus, and Fig. 2 a detached sectional view of a portion of the same.

The letter A indicates a tank or vessel of metal or other material, of any desired shape and size, which is located in the upper part of a building or structure or otherwise elevated above the machinery to be lubricated. Through the said tank or vessel passes longitudinally a rock-shaft, B, which is journaled in suitable bearings in the ends of the tank or vessel, and has mounted on its projecting end a drum or pulley, B', having a chain extending downward within convenient reach from below, by means of which said shaft may be partially rotated. The said shaft is held in and returned to a normal position by means of a spring, C, and is provided with a series of arms, D, which carry the cups E, as indicated in Fig. 1 of the drawings. To one edge of the tank or vessel is secured a trough, F, from which extend the conduits G to the respective parts of the machinery to be oiled or lubricated. In the present instance the conduits are shown as arranged to supply the lubricating material to a rotary shaft and its bearings, a reciprocating rod and its guide, and to a wrist-pin and its connecting-sleeve, to which the reciprocating rod is attached. In the case of the wrist-pin and its sleeve, in order to permit the same to move properly, the conduit is made in three sections, the upper one being provided with a semi-cylindrical casing, H, at its lower end, which casing is open at its bottom and has pivoted within it a semi-cylindrical cup, I, from which extends a pipe, K, upon which is adapted to slide the tubular section L, which is provided at its lower end with a semicircular open-bottomed casing, M, within which is pivoted the cup N, connected to the tube P, attached to the sleeve. It will be perceived that this construction permits the conduit to move with the wrist-pin, and thus supply the oil or lubricant to the same.

The operation of my invention is as follows: The cups on the ends of the radial arms attached to the longitudinal shaft set normally in the lubricant at the bottom of the tank or vessel. When it is desired to supply the lubricant to the machinery the shaft is turned by drawing on the chain in such manner as to invert the cups, which are filled with oil, over the trough at one side, so as to supply it in proper quantities to the conduits, to be delivered to the parts to be lubricated.

Having thus described my invention, what I claim, and desire to secure by Letters Patent, is—

1. In an apparatus for lubricating machinery, the combination of an elevated tank or vessel having a rock-shaft provided with arms carrying suitable cups, and a pulley or drum provided with a chain, whereby the apparatus may be operated to distribute the oil or lubricant to the parts to be lubricated, substantially as specified.

2. In combination with the tank or vessel adapted to hold the lubricant, the trough at one side of the same, the rock-shaft having arms carrying suitable cups, and the conductors connecting with the parts to be lubricated, substantially as specified.

3. In combination with the tank holding the lubricant, the conductor constructed in sections and adapted to move with the movable parts of the apparatus to supply the lubricant to the parts to be lubricated, substantially as and for the purposes specified.

In testimony whereof I affix my signature in presence of two witnesses.

ORSON COLVIN.

Witnesses:
T. W. SMITH,
J. R. MCCALL.